United States Patent
Moore

(10) Patent No.: US 11,579,290 B2
(45) Date of Patent: Feb. 14, 2023

(54) LIDAR SYSTEM UTILIZING MULTIPLE NETWORKED LIDAR INTEGRATED CIRCUITS

(71) Applicant: STMicroelectronics (Research & Development) Limited, Marlow (GB)

(72) Inventor: John Kevin Moore, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 875 days.

(21) Appl. No.: 16/432,682

(22) Filed: Jun. 5, 2019

(65) Prior Publication Data

US 2020/0386888 A1  Dec. 10, 2020

(51) Int. Cl.
G01S 17/00 (2020.01)
G01S 17/10 (2020.01)
G01S 17/931 (2020.01)

(52) U.S. Cl.
CPC ............ *G01S 17/10* (2013.01); *G01S 17/931* (2020.01)

(58) Field of Classification Search
USPC ............................................... 356/4.01, 5.01
See application file for complete search history.

(56) References Cited

U.S. PATENT DOCUMENTS

| | | | |
|---|---|---|---|
| 6,087,811 A | 7/2000 | Crawford et al. |
| 6,246,708 B1 | 6/2001 | Thornton et al. |
| 6,252,893 B1 | 6/2001 | Stange |
| 6,262,540 B1 | 7/2001 | Seko |
| 6,389,050 B2 | 5/2002 | Stronczer |
| 6,526,076 B2 | 2/2003 | Cham et al. |
| 6,563,848 B1 | 5/2003 | Iwazaki |
| 6,822,987 B2 | 11/2004 | Diaz et al. |
| 6,947,456 B2 | 9/2005 | Chin et al. |

(Continued)

FOREIGN PATENT DOCUMENTS

| CN | 112234432 A | 1/2021 |
|---|---|---|
| DE | 19912463 A1 | 9/2000 |

(Continued)

OTHER PUBLICATIONS

"Cepton LiDAR Goes Anti-MEMS Route," EEJournal, Jul. 31, 2018 (8 pages).

(Continued)

*Primary Examiner* — James R Hulka
(74) *Attorney, Agent, or Firm* — Crowe & Dunlevy

(57) ABSTRACT

A ranging system includes a first ranging unit with a first laser driver, a first control circuit generating a first trigger signal, and a first data interface with a first trigger transmitter transmitting the first trigger signal over a first data transmission line and a first calibration receiver receiving a first calibration signal over a second data transmission line. A second ranging unit includes a second laser driver, a second data interface with a second trigger receiver receiving the first trigger signal and a second calibration transmitter transmitting the first calibration signal, and a second control circuit generating the first calibration signal in response to receipt of the first trigger signal. The first control circuit determines an elapsed time between transmission of the first trigger signal and receipt of the first calibration signal. The determined elapsed time is used to synchronize activation of the first and second laser drivers.

17 Claims, 3 Drawing Sheets

(Calibration Mode, Ranging While Calibrating Mode)

(56) References Cited

U.S. PATENT DOCUMENTS

| | | | |
|---|---|---|---|
| 7,006,543 B2 | 2/2006 | Self et al. | |
| 7,009,370 B2 | 3/2006 | Deaton | |
| 8,368,876 B1 | 2/2013 | Johnson et al. | |
| 8,837,539 B1 | 9/2014 | Sun et al. | |
| 8,933,979 B2 | 1/2015 | Seki | |
| 9,161,019 B2* | 10/2015 | Millett | H04N 13/271 |
| 9,516,244 B2* | 12/2016 | Borowski | G01S 7/4868 |
| 9,667,022 B1 | 5/2017 | Burkholder | |
| 9,780,527 B1 | 10/2017 | Lee | |
| 9,876,328 B1 | 1/2018 | Wappis et al. | |
| 10,067,224 B2* | 9/2018 | Moore | G04F 10/005 |
| 10,203,366 B2 | 2/2019 | Burlak et al. | |
| 10,250,011 B2 | 4/2019 | Van Der Tempel et al. | |
| 10,264,653 B2* | 4/2019 | Moore | H01S 5/042 |
| 10,359,507 B2* | 7/2019 | Berger | G01S 17/42 |
| 10,571,568 B2* | 2/2020 | Iida | G01S 7/4817 |
| 10,591,600 B2* | 3/2020 | Villeneuve | H01S 5/4012 |
| 10,663,595 B2* | 5/2020 | Curatu | G01S 17/87 |
| 10,942,257 B2* | 3/2021 | Bao | G01S 17/931 |
| 2001/0028665 A1* | 10/2001 | Stronczer | H01S 5/0427 372/38.02 |
| 2002/0064193 A1* | 5/2002 | Diaz | H01S 5/042 372/26 |
| 2002/0075911 A1* | 6/2002 | Cham | G02B 6/4249 372/29.011 |
| 2002/0105982 A1* | 8/2002 | Chin | H01S 5/062 372/38.02 |
| 2002/0122308 A1 | 9/2002 | Ikeda | |
| 2003/0025972 A1 | 2/2003 | During et al. | |
| 2003/0039280 A1 | 2/2003 | Mangano et al. | |
| 2003/0205949 A1 | 11/2003 | Rueger et al. | |
| 2004/0212867 A1* | 10/2004 | Self | H03F 3/45183 359/245 |
| 2005/0276294 A1 | 12/2005 | Crawford et al. | |
| 2006/0133435 A1 | 6/2006 | Ikeda | |
| 2007/0274355 A1 | 11/2007 | Hattori | |
| 2008/0253418 A1 | 10/2008 | Egawa et al. | |
| 2009/0034566 A1 | 2/2009 | Noda et al. | |
| 2010/0128247 A1* | 5/2010 | Heizmann | G01S 17/10 356/5.01 |
| 2010/0142336 A1 | 6/2010 | Ishibashi et al. | |
| 2010/0244737 A1 | 9/2010 | Madhani et al. | |
| 2012/0033692 A1 | 2/2012 | Schleuning et al. | |
| 2013/0154494 A1 | 6/2013 | Hoogzaad et al. | |
| 2013/0300838 A1* | 11/2013 | Borowski | H04N 5/335 348/46 |
| 2014/0071234 A1 | 3/2014 | Millett | |
| 2014/0211192 A1 | 7/2014 | Grootjans et al. | |
| 2014/0312233 A1 | 10/2014 | Mark et al. | |
| 2015/0053163 A1 | 2/2015 | Bolz | |
| 2015/0078409 A1 | 3/2015 | Sugihara et al. | |
| 2015/0130903 A1 | 5/2015 | Thompson et al. | |
| 2016/0233643 A1 | 8/2016 | Fujimoto et al. | |
| 2017/0070029 A1 | 3/2017 | Moeneclaey et al. | |
| 2017/0115381 A1* | 4/2017 | Moore | G01S 7/4861 |
| 2017/0153319 A1 | 6/2017 | Villeneuve et al. | |
| 2017/0365979 A1 | 12/2017 | Van Der Tempel et al. | |
| 2018/0003762 A1* | 1/2018 | Burlak | G01R 31/2874 |
| 2018/0058924 A1* | 3/2018 | Storm | G01J 1/4204 |
| 2018/0103528 A1 | 4/2018 | Moore | |
| 2018/0106903 A1 | 4/2018 | Iida et al. | |
| 2018/0183209 A1 | 6/2018 | Nerheim | |
| 2018/0188355 A1 | 7/2018 | Bao et al. | |
| 2018/0188360 A1 | 7/2018 | Berger et al. | |
| 2018/0188361 A1 | 7/2018 | Berger et al. | |
| 2018/0284285 A1 | 10/2018 | Curatu | |
| 2018/0301872 A1 | 10/2018 | Burroughs et al. | |
| 2018/0301874 A1 | 10/2018 | Burroughs et al. | |
| 2018/0301875 A1 | 10/2018 | Burroughs et al. | |
| 2019/0097395 A1 | 3/2019 | Uno et al. | |
| 2019/0207364 A1 | 7/2019 | Song et al. | |
| 2019/0230304 A1* | 7/2019 | Moore | H03L 7/099 |
| 2019/0334316 A1 | 10/2019 | Kondo | |
| 2020/0011732 A1* | 1/2020 | Dutton | G01J 1/44 |
| 2020/0173846 A1* | 6/2020 | Moore | G01J 1/44 |
| 2020/0178361 A1 | 6/2020 | Oka | |
| 2021/0302550 A1* | 9/2021 | Dutton | G01S 17/89 |

FOREIGN PATENT DOCUMENTS

| | | |
|---|---|---|
| DE | 102011011875 B3 | 7/2012 |
| EP | 2189804 A1 | 5/2010 |
| GB | 2537505 B | 10/2017 |
| WO | 2017154128 A1 | 9/2017 |
| WO | 2018196001 A1 | 11/2018 |
| WO | 2019083750 A1 | 5/2019 |
| WO | 2020126575 A1 | 6/2020 |

OTHER PUBLICATIONS

"Advanced driver assistance systems," First Sensor Mobility, found at https://www.first-sensor.com/en/applications/mobility/advanced-driver-assistance-systems/ (2019) (5 pages).

EP Search Report and Written Opinion for family-related EP Appl. No. 20178163.0, report dated Oct. 15, 2020, 6 pages.

* cited by examiner

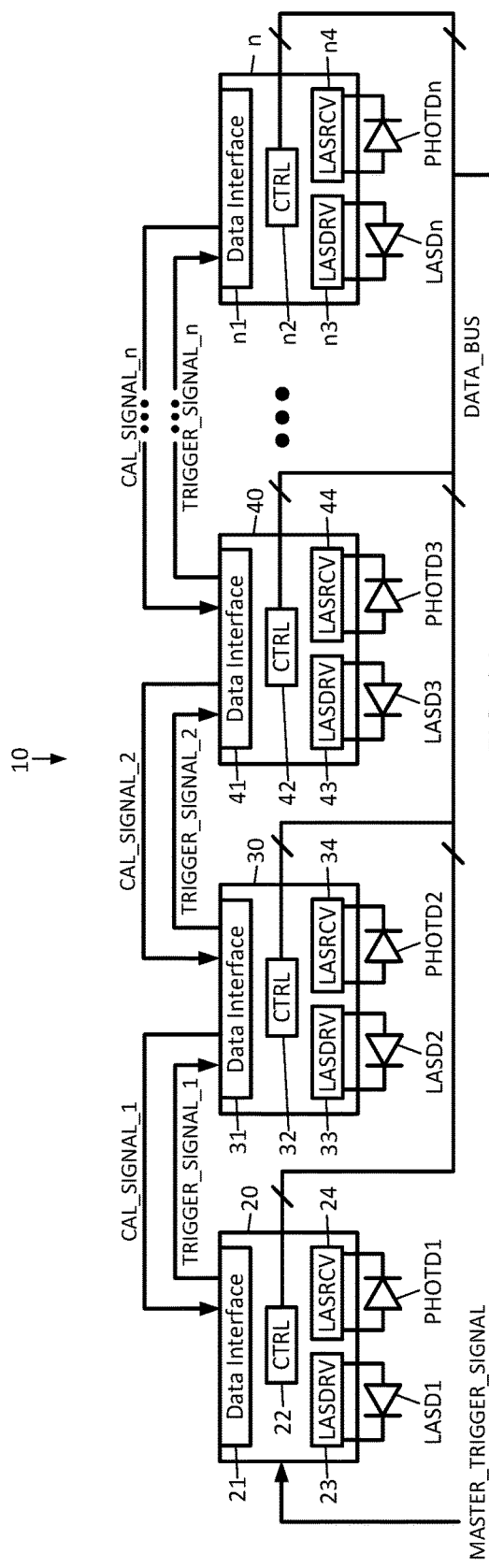
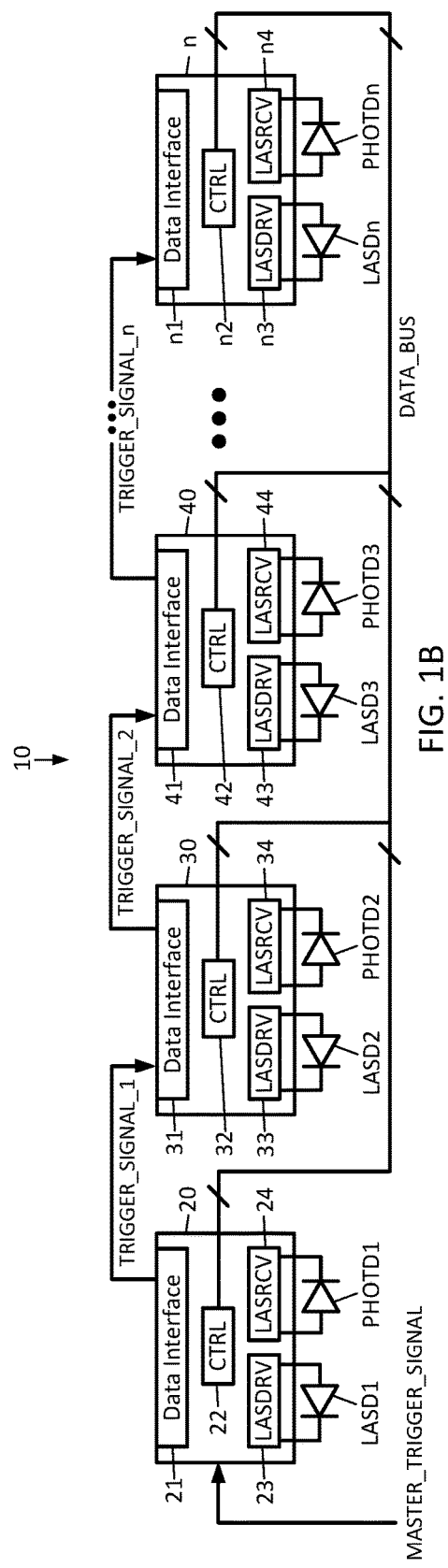

LIDAR SYSTEM UTILIZING MULTIPLE NETWORKED LIDAR INTEGRATED CIRCUITS

TECHNICAL FIELD

This application relates to the field of LIDAR ranging systems, and in particular, to the use of multiple networked integrated circuits each containing a LIDAR unit to increase accuracy through the emission of additional laser photons and the corresponding receipt of additional returned photons by targets impinged upon.

BACKGROUND

Light detection and ranging (LIDAR) systems are used to measure distance to a target by illuminating the target with pulsed laser light and measuring the reflected pulses with a sensor. Differences in return times and wavelengths of the return laser light can then be used to determine the distance to the target.

One popular use for LIDAR systems is in safety systems for vehicles. By using LIDAR to continuously monitor the distance to objects (or other vehicles) around a vehicle, a vehicle computer can take corrective action (e.g., braking or steering around an object or other vehicle) so as to avoid an imminent collision. Another vehicular use of LIDAR systems is for driver assistance, such as providing the driver with information about the proximity of the vehicle to objects (or other vehicles) while performing parking maneuvers or while driving.

One particular challenge with the development of LIDAR systems for use in vehicles is that such LIDAR systems are desired to be compact so as to fit within vehicle design constraints (e.g., sized to fit within a headlight housing of a vehicle). In order for such systems to work reliably, it is desired for the sensors within these LIDAR systems to receive as many returned photons as possible. However, this is limited by the physical size of the lens associated with the sensors.

In addition, since such LIDAR systems are typically integrated within a single integrated circuit or package, issues inherent to integrated circuits are present, such as heat management, supply voltage management, and yield issues during manufacture. Indeed, it has been found to be difficult to form and properly operate LIDAR systems within integrated circuits over 100 mm$^2$ in size, which in turns limits the size of the sensor and its associated lens.

Yet another limitation imposed on such systems is that of output power of the laser light used, since laser light of sufficient power can cause damage to that which it impinges upon. However, the greater the power of the laser used, the more photons contained by the laser beam, meaning that more returned photons are received. This leads to the scenario that existing solutions in which the LIDAR system is contained within an integrated circuit or package emit low power lasers at low duty cycles, leading to a less than desired number of returned photons, in turn leading to accuracy and range detection capability that is less than ideal. Other existing solutions instead use large and expensive arrays of laser emitters and sensors, making their use in vehicular applications impractical.

Therefore, further development into the area of LIDAR systems for use in compact applications (not just automotive) is needed.

SUMMARY

An embodiment disclosed herein is directed to a ranging system. The ranging system includes a first ranging unit that has a first laser driver, a first control circuit configured to generate a first trigger signal, and a first data interface. The first data interface includes a first trigger transmitter configured to transmit the first trigger signal over a first data transmission line and a first calibration receiver configured to receive a first calibration signal over a second data transmission line. The ranging system also includes a second ranging unit having a second laser driver, a second data interface with a second trigger receiver configured to receive the first trigger signal over the first data transmission line and a second calibration transmitter configured to transmit the first calibration signal over the second data transmission line, and a second control circuit configured to generate the first calibration signal in response to receipt of the first trigger signal by the second trigger receiver. The first control circuit is configured to determine an elapsed time between transmission of the first trigger signal by the first trigger transmitter and receipt of the first calibration signal by the first calibration receiver.

The first control circuit may generate a first control signal for the first laser driver to cause delayed activation of the first laser driver, the delay of the activation of the first laser driver being a function of the elapsed time determined by the first control circuit. The second control circuit may generate a second control signal for the second laser driver to cause activation of the second laser driver based upon receipt of the first trigger signal by the second trigger receiver.

The delay may be one half the elapsed time determined by the first control circuit, and the second control circuit may generate the second control signal to cause activation of the second laser driver substantially immediately upon receipt of the first trigger signal, such that the first and second control signals cause substantially simultaneous activation of the first and second laser drivers.

The first and second data interfaces may be low voltage differential sensing (LVDS) data interfaces.

The first control circuit may include a first elapsed time measurement circuit configured to activate upon generation of the first trigger signal and to determine an elapsed time between transmission of the first trigger signal by the first trigger transmitter and receipt of the first calibration signal by the first calibration receiver.

The first control circuit may include a first elapsed time measurement circuit configured to activate upon generation of the first trigger signal and to determine an elapsed time between transmission of the first trigger signal by the first trigger transmitter and receipt of the first calibration signal by the first calibration receiver, and a delay circuit configured to generate a first control signal for the first laser driver to cause the first laser driver to activate a delay time after generation of the first trigger signal, the delay time being a function of the elapsed time determined by the first elapsed time measurement circuit.

The delay time may be equal to one half of the determined elapsed time.

The first control circuit may also include a multiplexer configured to selectively pass a master trigger signal as the first trigger signal in response to a master/slave selection signal.

The first and second ranging units may be integrated circuit chips.

The first ranging unit may also include a first laser unit driven by the first laser driver, and the second ranging unit may also include a second laser unit driven by the second laser driver. The first and second ranging units may be physically arranged with respect to one another such that a first aperture through which the first laser unit emits laser beams is spaced apart from a second aperture through which the second laser unit emits laser beams by a first spacing distance.

The first spacing distance may in some cases be no more than 1 cm.

The first laser unit may have a first field of view, and the second laser unit may have a second field of view equal in span of angle to the first field of view.

The first laser unit may include a first array of laser diodes driven by the first laser driver, and the second laser unit may include a second array of laser diodes driven by the second laser driver.

The second data interface may include a second calibration receiver configured to receive a second calibration signal over a fourth data transmission line, and a second trigger transmitter configured to transmit a second trigger signal over a third data transmission line. The second control circuit may be further configured to generate the second trigger signal based upon receipt of the first trigger signal by the second trigger receiver over the first data transmission line, and to determine an elapsed time between transmission of the second trigger signal by the second trigger transmitter and receipt of the second calibration signal by the second calibration receiver. The second data interface may also include a third ranging unit, the third ranging unit including a third laser driver, a third data interface with a third trigger receiver configured to receive the second trigger signal over the third data transmission line, and a third calibration transmitter configured to transmit the second calibration signal over the fourth data transmission line. The second data interface may also include a third control circuit configured to generate the second calibration signal in response to receipt of the second trigger signal by the third trigger receiver.

The first control circuit may generate a first control signal for the first laser driver to cause delayed activation of the first laser driver, the delay of the activation of the first laser driver being a function of the elapsed time determined by the first control circuit and the elapsed time determined by the second control circuit. The second control circuit may generate a second control signal for the second laser driver to cause delayed activation of the second laser driver, the delay of the activation of the second laser driver being a function of the elapsed time determined by the second control circuit. The third control circuit may generate a third control signal for the third laser driver to cause activation of the third laser driver based upon receipt of the second trigger signal by the third trigger receiver.

The delay of activation of the first laser driver may be equal to a sum of one half the elapsed time determined by the first control circuit and one half the elapsed time determined by the second control circuit. The delay of activation of the second laser driver may be equal to one half the elapsed time determined by the second control circuit. The third control circuit may generate the third control signal to cause activation of the third laser driver substantially immediately upon receipt of the second trigger signal, such that the first, second, and third control signals cause substantially simultaneous activation of the first, second, and third laser drivers.

The second control circuit may send the elapsed time determined by the second control circuit to the first control circuit over a data bus.

Method aspects are disclosed herein. One method aspect is directed to a method of synchronizing light output of a number N of ranging chips within a ranging system, the method including determining light output activation delays for first through the (N−1)th ranging chips by performing steps of: a1) defining a number n to be equal to a first of the N ranging units; a2) transmitting a trigger signal from an nth ranging unit to an (n+1)th ranging unit; a3) receiving the trigger signal at the (n+1)th ranging unit; a4) transmitting a calibration signal back from the (n+1)th ranging unit to the nth ranging unit; a5) determining an elapsed time between transmission of the trigger signal by the nth ranging unit and receipt of the calibration signal by the nth ranging unit and storing the elapsed time as an elapsed time for the nth ranging unit; a6) determining a light output activation delay for the nth ranging unit to be equal to a sum of the elapsed time for the nth ranging unit and the elapsed times for the first through the (n−1)th ranging unit; and a7) if n is less than N−2, incrementing n, and returning to step a2).

The method may also include activating the N ranging chips to output light in a synchronized fashion, by performing steps of: b1) defining a number m to be equal to a first of the N ranging units; b2) transmitting a trigger signal from a mth ranging unit to a (m+1)th ranging unit; b3) activating a laser of the mth ranging unit a time period after performing step b2), the time period equal to the light output activation delay for the mth ranging unit; b4) if m is less than N−2, incrementing m, and returning to step b2); and b5) if m is equal to N−1, incrementing m, and activating a laser of the mth ranging unit upon receipt of the trigger signal by the mth ranging unit from the (m−1)th ranging unit.

BRIEF DESCRIPTION OF THE DRAWINGS

FIG. 1A is a simplified block diagram of a LIDAR system disclosed herein when operating in a calibration mode.

FIG. 1B is a simplified block diagram of a LIDAR system disclosed herein when operating in a ranging mode.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

In general, this disclosure is directed to hardware and operating techniques which enable increasing of the sensitivity and range of LIDAR ranging devices embodied within integrated circuits or packages. Therefore, disclosed herein is a LIDAR ranging system that is comprised of multiple networked LIDAR integrated circuit chips spaced apart from one another, but having substantially the same field of view (for example, not identical due to parallax error) and operating in a synchronized fashion (e.g., each ranging laser of each networked LIDAR integrated circuit chip accounts for network data transmission rates to therefore emit its ranging laser at substantially the same time as each other ranging laser of each other networked LIDAR integrated circuit chip). As used herein, "substantially the same time" and "substantially simultaneously" are synonymous, and are to be considered to mean "within 1 ns of one another".

Figure 1C:
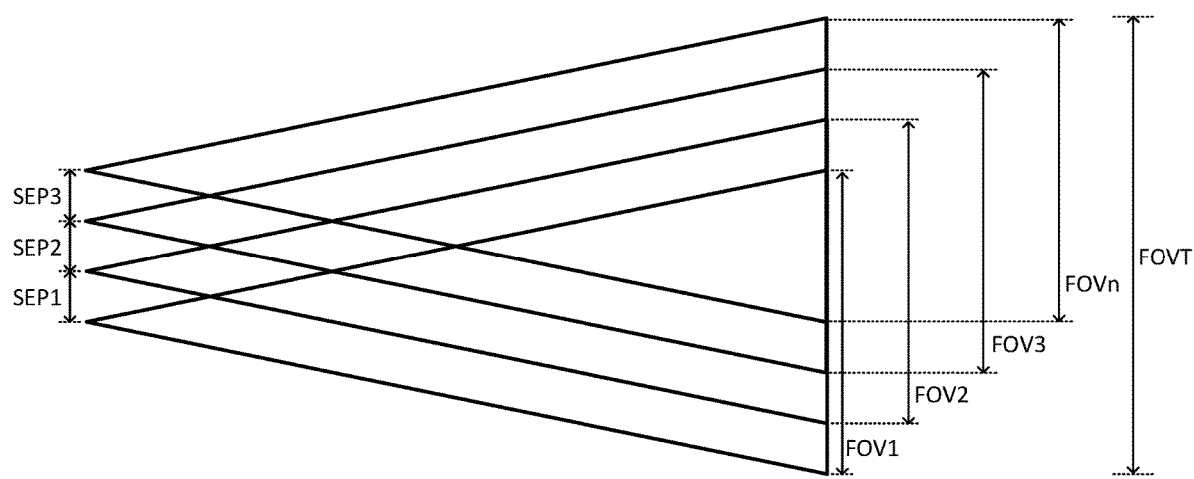
FIG. 1C is a diagram illustrating the fields of view of the laser diodes of the LIDAR system of FIGS. 1A-1B, as well as the combined overall field of view.

First, the basic operating principles generally described above will be described in detail with reference to the block diagrams of FIGS. 1A-1C, and later a specific embodiment will be described with reference to an additional figure. The LIDAR ranging system 10 of FIGS. 1A-1B includes a plurality of LIDAR integrated circuits (IC) or chip packages 20, 30, 40, . . . , n, with package 20 being the first LIDAR IC the chain and package n being the last LIDAR IC in the chain, it being noted that "n" can be any integer number, and thus the LIDAR ranging system 10 may contain any number of LIDAR ICs.

Each LIDAR IC can be considered to be a "master" with respect to the LIDAR IC immediately following it in the chain, and can be considered to be a "slave" with respect to the LIDAR IC immediately preceding it in the chain. Therefore, LIDAR IC 20 is a master to the immediately following LIDAR IC 30 but is not a slave because it is the first in the chain. LIDAR IC 30 is a slave to the immediately preceding LIDAR IC 20 in the chain, and is a master to the immediately following LIDAR IC 40 in the chain. LIDAR IC 40 is a slave to the immediately preceding LIDAR IC 30, and a master to the immediately following LIDAR IC n. LIDAR IC n is a slave to the immediately preceding LIDAR IC 40, but is not a master because it is the last in the chain.

Each LIDAR IC 20, 30, 40, . . . , n includes a respective data interface 21, 31, 41, . . . , n1, control circuitry or controller 22, 32, 42, . . . , n2, laser driver 23, 33, 43, . . . , n3, and laser receiver 24, 34, 44, . . . , n4. Respective one or more laser diodes LASD1, LASD2, LASD3, . . . , LASDn are activatable by their associated laser drivers 23, 33, 43, . . . , n3 to provide ranging laser light while respective one or more photodetectors PHOTD1, PHOTD2, PHOTD3, . . . , PHOTDn to detect returned photons of the ranging laser light that has reflected off a target and returned. Each control circuit or controller 22, 32, 42, . . . , n2 is connected to a data bus DATA_BUS Operation will now be described. The LIDAR ranging system 10 has three possible modes of operation, namely a calibration mode in which calibration is solely performed, a ranging while calibrating mode in which ranging and calibration are simultaneously performed, and a ranging mode in which ranging is solely performed. Note that an embodiment in which there is only a calibration mode and a ranging mode is within the scope of this disclosure.

Refer first to LIDAR ranging system 10 in FIG. 1A, which is operating in a calibration mode for purposes of this description. To begin, a master trigger signal (MASTER_TRIGGER_SIGNAL) is asserted. Ultimately, this assertion of MASTER_TRIGGER_SIGNAL is received by the control circuitry 22 of the LIDAR IC 20, which in turn causes its associated data interface 21 to transmit a first trigger signal (TRIGGER_SIGNAL_1) to the data interface 31 of the LIDAR IC 30 over an associated interconnecting data transmission line.

Immediately upon receipt of TRIGGER_SIGNAL_1 by the data interface 31, its associated control circuitry 32 causes the data interface 31 to transmit a first calibration signal (CAL_SIGNAL_1) back to the data interface 21 of the LIDAR IC 20 over an associated interconnecting data transmission line. At the same time, the control circuitry 32 also causes the data interface 31 to transmit a second trigger signal (TRIGGER_SIGNAL_2) to the data interface 41 of the LIDAR IC 40 over an associated interconnecting data transmission line.

Immediately upon receipt of TRIGGER_SIGNAL_2 by the data interface 41, its associated control circuitry 42 causes the data interface 41 to transmit a second calibration signal (CAL_SIGNAL_2) back to the data interface 31 of the LIDAR IC 23 over an associated interconnecting data transmission line. At the same time, the control circuitry 42 also causes the data interface 41 to transmit an nth trigger signal (TRIGGER_SIGNAL_n) to the data interface n1 of the nth LIDAR IC n over an associated interconnecting data transmission line.

It is pointed out that the loads of the different interconnecting data transmission lines used to carry the trigger signals TRIGGER_SIGNAL_1, TRIGGER_SIGNAL_2, TRIGGER_SIGNAL_n are balanced to those of their respective interconnecting data transmission lines carrying the respective calibration signals CAL_SIGNAL_1, CAL_SIGNAL_2, CAL_SIGNAL_n. Stated another way, the data transmission lines carrying TRIGGER_SIGNAL_1 and CAL_SIGNAL_1 are balanced in terms of load, the data transmission lines carrying TRIGGER_SIGNAL_2 and CAL_SIGNAL_2 are balanced in terms of load, and the data transmission lines carrying TRIGGER_SIGNAL_n and CAL_SIGNAL_n are balanced in terms of load.

Note that the control circuitry 22, 32, 42 of each of the LIDAR ICs 20, 30, 40 measures the elapsed time between the transmission of its associated trigger signal TRIGGER_SIGNAL_1, TRIGGER_SIGNAL_2, . . . , TRIGGER_SIGNAL_n by its associated data interface 21, 32, 41 and the receipt of the respective calibration signal CAL_SIGNAL_1, CAL_SIGNAL_2, . . . , CAL_SIGNAL_n by its associated data interface 21, 32, 41 from the next LIDAR IC in the chain. These elapsed times can be referred to as ET1, ET2, ETn.

The elapsed time ET1 represents the time between the LIDAR IC 20 sending the TRGGER_SIGNAL_1 to the LIDAR IC 30 and receipt of the CALIBRATION_SIGNAL_1 from the LIDAR IC 30. This elapsed time is therefore two traversals of the data path between the LIDAR IC 20 and the LIDAR IC 30 (due to the balanced data transmission line loads). Accordingly, one traversal of the data path between LIDAR IC 20 and LIDAR IC 30 would be 0.5*ET1, which can be referred to (for reasons which will be explained below) as DELAY1.

The elapsed time ET2 represents the time between the LIDAR IC 30 sending the TRGGER_SIGNAL_2 to the LIDAR IC 40 and receipt of the CALIBRATION_SIGNAL_2 from the LIDAR IC 40. This elapsed time is therefore two traversals of the data path between the LIDAR IC 30 and the LIDAR IC 40. One traversal of the data path would be 0.5*ET2, which can be referred to as DELAY2.

The elapsed time ET3 represents the time between the LIDAR IC 40 sending the TRGGER_SIGNAL_n to the LIDAR IC n and receipt of the CALIBRATION_SIGNAL_n from the LIDAR IC n. This elapsed time is therefore two traversals of the data path between the LIDAR IC 40 and the LIDAR IC n. One traversal of the data path would be 0.5*ET3, which can be referred to as DELAYn.

Each LIDAR IC except the first and last in the chain (e.g., LIDAR ICs 30, 40) then transmits its respective determined elapsed time ET2, ETn or determined delay DELAY2, DELAYn over the data bus DATA_BUS to each LIDAR IC before it in the chain. Therefore, LIDAR IC 20 will receive elapsed times ET2 and ETn or delay times DELAY2, DELAYn over the data bus DATA_BUS, and LIDAR IC 20 will receive elapsed time ETn or delay time DELAYn over the data bus DATA_BUS.

Alternatively, each LIDAR IC 20, 30, 40 that determines an elapsed time ET1, ET2, ETn or delay time DELAY1, DELAY2, DELAYn transmits its respective determined elapsed time ET1, ET2, ETn over the data bus DATA_BUS, and each LIDAR IC 20, 30, 40, . . . , n receives all elapsed times or delay times (except the elapsed time or delay time that it transmitted) over the data bus DATA_BUS.

It is desired for each LIDAR IC 20, 30, 40, . . . , n to activate its laser diode LASD1, LASD2, LASD3, . . . , LASDn substantially simultaneously. Since it will take a total delay time equal to DELAY1+DELAY2+ . . . +DELAYn for the last LIDAR IC n in the chain to receive TRIGGER_SIGNAL_n, appropriate activation delays can be determined and set by the control circuitry 22, 32, 43 of each LIDAR IC 20, 30, 40 so that upon receipt of TRIGGER_SIGNAL_n by the LASER IC n, each control circuit 22, 32, 42, . . . , n2 will substantially simultaneously turn on its associated laser diode LASD1, LASD2, LASD3, . . . , LASDn.

The delay calculation for activation is as follows. Each LIDAR IC 20, 30, 40 except the last in the chain (e.g., each LIDAR IC that functions as a master) calculates its own appropriate activation delay ACTDELAY1, ACTDELAY2, ACTDELAYn as being the sum of the delay DELAY1, DELAY2, DELAYn or elapsed time ET1, ET2, ETn that it calculated for its own trigger signal TRIGGER_SIGNAL_1, TRIGGER_SIGNAL_2, TRIGGER_SIGNAL_n to reach the next LIDAR IC 30, 40, n, together with each delay DELAY2, DELAYn or elapsed time ET2, ETn that it received from subsequent LIDAR ICS 30, 40, n over the data bus DATA_BUS.

This is perhaps best understood by example. The activation delay, ACTDELAY1, is for the LIDAR IC 20. Assume for purposes of this example that the control circuit n2 will activate its laser diode LASDn substantially immediately upon receipt of TRIGGER_SIGNAL_n. Therefore, ACTDELAY1 should be DELAY1+DELAY2+ . . . +DELAYn. As such, the control circuitry 22 of the LIDAR IC 20 uses the determined ET1 or DELAY1, together with the received ET2, ETn or DELAY2, DELAYn to calculate ACTDELAY1.

Similarly, the activation delay, ACTDELAY2, is for the LIDAR IC 30. The control circuitry 32 of the LIDAR IC 30 uses the determined ET2 or DELAY2, together with the received ETn or DELAYn to calculate ACTDELAY2.

Likewise, the activation delay, ACTDELAY3, is for the LIDAR IC 40. The control circuitry 42 of the LIDAR IC 40 uses the determined ETn or DELAYn to calculate ACTDELAY3.

Now that ACTDELAY1, ACTDELAY2, and ACTDELAY3 have been determined, operation of the LIDAR ranging system 10 can proceed to the ranging mode. This is shown in FIG. 1B.

Here, MASTER_TRIGGER_SIGNAL is first asserted. This causes the control circuitry 22 of the LIDAR IC 20 to cause its associated data interface 21 to transmit TRIGGER_SIGNAL_1 to the data interface 31 of the LIDAR IC 30 over the associated interconnecting data transmission line. Upon receipt of TRIGGER_SIGNAL_1 by the data interface 31, the control circuit 32 causes the data interface 32 to transmit TRIGGER_SIGNAL2 to the data interface 31 of the LIDAR IC 40 over the associated interconnecting transmission line. Upon receipt of TRIGGER_SIGNAL_2 by the data interface 41, the control circuit 42 causes the data interface 42 to transmit TRIGGER_SIGNALn to the data interface n1 of the LIDAR IC n over the associated interconnecting transmission line.

The control circuit 22 of the LIDAR IC 20 causes its associated laser driver 23 to activate its laser diode LASD1 a time equal to ACTDELAY1 after transmission of TRIGGER_SIGNAL1. Likewise, the control circuit 32 of the LIDAR IC 30 causes its associated laser driver 33 to activate its laser diode LASD2 a time equal to ACTDELAY2 after transmission of TRIGGER_SIGNAL2. Similarly, the control circuit 42 of the LIDAR IC 40 causes its associated laser driver 43 to activate its laser diode LASD3 a time equal to ACTDELAY3 after transmission of TRIGGER_SIGNALn. The control circuit n2 of the LIDAR IC n causes its associated laser driver n3 to activate its laser diode LASDn immediately upon receipt of TRIGGER_SIGNALn.

This way, each laser diode LASD1, LASD2, LASD3, . . . , LASDn is activated at substantially the same time, and thus synchronization between the LIDAR ICs 20, 30, 40, . . . , n has been achieved. This technique may be applied to any number of LIDAR ICs, such that a large number of LIDAR ICs may be synchronized using this arrangement.

The photodiodes PHOTD1, PHOTD2, PHOTD3, . . . , PHOTDn receive photons of light emitted by the laser diodes LASD1, LASD2, LASD3, . . . , LASDn that reflect off an object and is returned. One way is assembling the outputs collected by the photodiodes PHOTD1, PHOTD2, PHOTD3, . . . , PHOTDn is to form a histogram of the output of each, and to then add the histograms to increase signal to noise ratio. To accomplish this, the control circuitry 22, 32, 42, . . . , n2 of each LIDAR IC 20, 30, 40, . . . , n forms a histogram of the output of its respective photodiode PHOTD1, PHOTD2, PHOTD3, . . . , PHOTDn and transmits that histogram to a system controller 50 over the data bus DATA_BUS, which adds the histograms to form a master histogram that can be analyzed and used with known techniques to perform a useful function (e.g., to provide an input to a safety system in a vehicle).

In some cases, the system controller 50 may evaluate the data in each histogram, and if the data in each histogram is usable (e.g., above the noise floor), the system controller 50 does not add the histograms, and instead analyzes each histogram separately to perform the useful function.

The LIDAR system 10 enables redundancy, since the failure of a single laser diode LASD1, LASD2, LASD3, . . . , LASDn or photodiode PHOTD1, PHOTD2, PHOTD3, . . . , PHOTDn will leave the system operable, albeit with reduced range or reduced resolution. In addition, by analyzing the individual histograms, it can be determined by the system controller 50 that one of the LIDAR ICs 20, 30, 40, . . . , n in the LIDAR system 10 has failed, and therefore a flag can be set for the LIDAR system 10 to be repaired or replaced. In fact, by analyzing the individual histograms, it can even be determined by the system controller 50 which of the LIDAR ICs 20, 30, 40, . . . , n in the LIDAR system 10 has experienced a failure, should such information be desirable.

It should be appreciated that instead of operating in ranging mode after at least one iteration of the calibration mode, the LIDAR ranging system 10 may operate in a ranging while calibrating mode. In ranging while calibrating mode, each LIDAR IC 20, 30, 40, . . . , n already has a corresponding calculated activation delay ACTDELAY1, ACTDELAY2, ACTDELAYn. Therefore, the control circuit 22 of the LIDAR IC 20 causes its associated laser driver 23 to activate its laser diode LASD1 a time equal to ACTDELAY1 after transmission of TRIGGER_SIGNAL1. Likewise, the control circuit 32 of the LIDAR IC 30 causes its associated laser driver 33 to activate its laser diode LASD2 a time equal to ACTDELAY2 after transmission of TRIGGER_SIGNAL2. Similarly, the control circuit 42 of the LIDAR IC 40 causes its associated laser driver 43 to activate its laser diode LASD3 a time equal to ACTDELAY3 after transmission of TRIGGER_SIGNALn. The control circuit n2 of the LIDAR IC n causes its associated laser driver n3 to activate its laser diode LASDn immediately upon receipt of TRIGGER_SIGNALn.

However, in this ranging while calibrating mode, the calibration signals CAL_SIGNAL_1, CAL_SIGNAL_2, CAL_SIGNAL_n are still transmitted by the data interfaces 31, 41, n1 to the data interfaces 21, 31, and 41, and are still used by the control circuits 22, 32, 42 to calculate the elapsed times ET1, ET2, ETn and delay times ET1, ET2, ETn. Likewise, control circuits 32, 42 will transmit their respective determined delay times ET2, ETn or delay times ET2, ETn over the data bus DATA_BUS. Consequently, LIDAR IC 20 will receive elapsed times ET2 and ETn or delay times DELAY2, DELAYn over the data bus DATA_BUS, and LIDAR IC 30 will receive elapsed time ETn or delay time DELAYn over the data bus DATA_BUS. The control circuit 22 of LIDAR IC 20 will then recalculate ACTDELAY1 as described above, the control circuit 32 of LIDAR IC 30 will recalculate ACTDELAY2 as described above, and the control circuit 42 of LIDAR IC 40 will recalculate ACTDELAYn as described above. These recalculated actuation delays ACTDELAY1, ACTDELAY2, ACTDELAYn will therefore be used synchronize the next activation of the laser diodes LASD1, LASD2, LASD3, . . . , LASDn as described above. This ranging while calibrating mode has the advantage of continually adjusting the actuation delays ACTDELAY1, ACTDELAY2, ACTDELAYn for each activation of the laser diodes LASD1, LASD2, LASD3, . . . , LASDn so as to take into account changes in operating conditions (e.g., operating temperature).

In some cases, instead of using the ranging while calibrating mode, the calibration mode and ranging mode may be alternated between. In other cases, one instance of the calibration mode may be performed for a certain number of iterations of the ranging mode. For example, after an initial iteration of the calibration mode, a calibration mode iteration may be performed after each five iterations of the ranging mode.

It should be understood that although in the example above, the control circuits 22, 32, 42 calculate their own actuation delays ACTDELAY1, ACTDELAY2, ACTDELAYn, in some cases, the control circuits 22, 32, 42 transmit their respective determined elapsed times ET1, ET2, ETn and delay times ET1, ET2, ETn to the system controller 50 over the data bus DATA_BUS, and the system controller 50 determines the actuation delays ACTDELAY1, ACTDELAY2, ACTDELAYn and transmits them back to the control circuits 22, 32, 42 over the data bus DATA_BUS.

As an alternative implementation, the LIDAR system 10 can be constructed so that it can be assumed that DELAY1, DELAY2, . . . , DELAYn are equal and fungible. Therefore, the system controller 50 can transmit a signal to the control circuit 22 indicating to it that the LIDAR IC 20 is the first LIDAR IC in the chain of n LIDAR ICs. Then, the control circuit 22 can estimate ACTDELAY1 as:

$$\text{ACTDELAY1}=(n-1)*\text{DELAY1}.$$

It follows the system controller 50 can transmit a signal to the control circuit 32 indicating to it that the LIDAR IC 30 is the second LIDAR IC in the chain of n LIDAR ICs. Then, the control circuit 32 can estimate ACTDELAY2 as:

$$\text{ACTDELAY2}=(n-2)*\text{DELAY2}$$

Similarly, the system controller 50 can transmit a system to the control circuit 42 indicating to it that the LIDAR IC 40 is the third LIDAR IC in the chain of n LIDAR ICs. Then, the control circuit 42 can estimate ACTDELAY3 as:

$$\text{ACTDELAY3}=(n-3)*\text{DELAY3}$$

The primary advantage of the LIDAR system 10 over prior art LIDAR systems is that the LIDAR system 10 increases the reflected photons received by a factor equal to the square of the total number of LIDAR ICs 20, 30, 40, . . . , n, while merely increasing the emitted photons by a factor equal to the total number of LIDAR ICs 20, 30, 40, . . . , n. This permits a range of up to and exceeding the 200 m desired for autonomous vehicles (with the aim being for the detection range to exceed minimum stopping distance of an autonomous vehicle at its top lawful operating speed).

Now that the purpose of, and calculations for, the actuation delays ACTDELAY1, ACTDELAY2, ACTDELAY3 have been described, the physical location of the laser diodes LASD1, LASD2, LASD3, . . . , LASDn with respect to one another is described with reference to the diagram of FIG. 1C. FOV1 is the field of view of LASD1, FOV2 is the field of view of LASD2, FOV3 is the field of view of LASD3, and FOVn is the field of view of LASDn. These fields of view FOV1, FOV2, FOV3, . . . , FOVn are equal in aperture. The laser diodes LASD1, LASD2, LASD3, . . . , LASDn are spaced apart from one another such that there is a separation SEP1 between FOV1 and FOV2, a separation SEP2 between FOV2 and FOV3, and a separation SEP3 between FOV3 and FOVn. While the laser diodes LASD1, LASD2, LASD3, . . . , LASDn are spaced apart from one another, this spacing is small, such that the separations SEP1, SEP2, SEP3 are for example equal to 1 cm, or even less (e.g., 5 mm). Therefore, the overall field of view FOVT of the LIDAR system 10 is barely greater than any of the individual fields of view FOV1, FOV2, FOV3, . . . , FOVn. Due to the separations SEP1, SEP2, SEP3, and the fact that (as explained) the LIDAR system 10 merely increases the emitted photons by a factor equal to the total number of LIDAR ICs 20, 30, 40, . . . , n, the LIDAR system 10 is compliant with existing laser safety regulations.

While each LIDAR IC 20, 30, 40, . . . , n is shown as having a single laser diode LASD1, LASD2, LASD3, . . . , LASDn, this illustration is so drawn for ease of explanation. In one actual real world implementation, each LIDAR IC 20, 30, 40, . . . , n will have an array of laser diodes. Therefore, understand that in such an instance, the master trigger signal MASTER_TRIGGER_SIGNAL, and the trigger signals TRIGGER_SIGNAL_1, TRIGGER_SIGNAL_2, TRIGGER_SIGNAL_n are used to trigger the start of the actuation sequence of the array of laser diodes of each LIDAR IC 20, 30, 40, . . . , n. The details of the actuation sequences, and what occurs during each actuation sequence is not described for sake of brevity, as such actuation sequences are known in the art. What it is to be noted is that each LIDAR IC 20, 30, 40, . . . , n will have an identical array of laser diodes and an identical actuation sequence to each other LIDAR IC 20, 30, 40, . . . , n, such that the synchronization can be performed with a single trigger signal MASTER_TRIGGER_SIGNAL, TRIGGER_SIGNAL_1, TRIGGER_SIGNAL_2, TRIGGER_SIGNAL_n per LIDAR IC 20, 30, 40, . . . , n. Consequently, when referring to FIGS. 1A-1B, the laser diodes LASD1, LASD2, LASD3, . . . , LASDn can each be considered to be an array of laser diodes, and the trigger signals MASTER_TRIGGER_SIGNAL, TRIGGER_SIGNAL_1, TRIGGER_SIGNAL_2, TRIGGER_SIGNAL_n initiate the actuation sequences of the arrays of laser diodes. Therefore, consider the fields of view FOV1, FOV2, FOV3, FOVn to be the fields of view of the arrays of laser diodes.

As an alternative to each LIDAR IC 20, 30, 40, . . . , n having an array of laser diodes, in a different real world implementation, each LIDAR IC 20, 30, 40, . . . , n may in fact have a single laser diode LASD1, LASD2, LASD3, . . . , LASDn that is steered using a MEMS micromirror. Regardless, the initiation of the scan pattern that will be followed by the MEMS micromirror for each LIDAR IC 20, 30, 40, . . . , n will be triggered by the trigger signals MASTER_TRIGGER_SIGNAL, TRIGGER_SIGNAL_1, TRIGGER_SIGNAL_2, TRIGGER_SIGNAL_n, enabling the synchronization described above. For this alternative, each LIDAR IC 20, 30, 40, . . . , n will have a substantially identical MEMS micromirror that follows an identical scan pattern, or scan patterns that take substantially identical amounts of time to complete. Consequently, when referring to FIGS. 1A-1B, the laser diodes LASD1, LASD2, LASD3, . . . , LASDn can each also be considered to be a laser diode steered by a MEMS micromirror, and the trigger signals MASTER_TRIGGER_SIGNAL, TRIGGER_SIGNAL_1, TRIGGER_SIGNAL_2, TRIGGER_SIGNAL_n initiate the scan patterns that will be followed by the MEMS micromirrors. Therefore for this example, consider the fields of view FOV1, FOV2, FOV3, FOVn to be the fields of view provided by the scan patterns.

Parallax error introduced by the separations SEP1, SEP2, SEP3 is now discussed. Consider that each field of view could be 100°, divided into 100 zones of 1° per zone. The 100° field of view at a range of 50 meters would be approximately 0.87 meters. Therefore, with a separation of 1 cm between adjacent laser diodes LASD1, LASD2, LASD3, . . . , LASDn, parallax error would be insignificant, and approximately two orders of magnitude lower than the spatial sampling resolution provided.

In the case of a range of 50 cm instead of 50 m, however, parallax error might be similar to spatial sampling resolution. Here though, the returned signal (e.g., number of received photons) will be much greater. Therefore, when range is this close, it may not be desirable to add the histograms as described above, but to instead use them separately as described above, such as to increase resolution.

Such a real world implementation could fit within the headlamp structure of a vehicle, enabling it to take advantage of headlamp washing systems within those vehicles to keep lenses covering the laser diode arrays and photodetectors clean.

Figure 2:
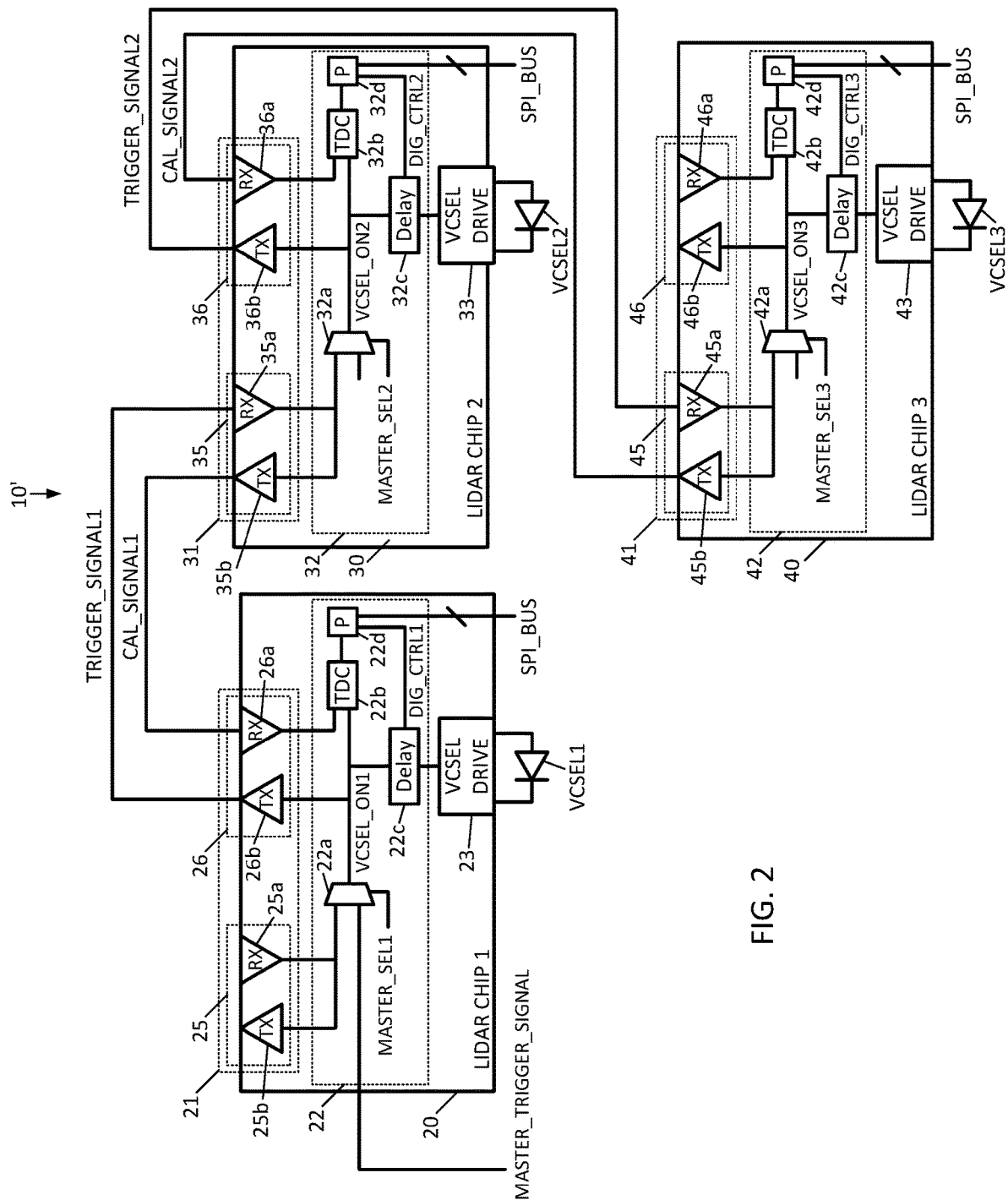
FIG. 2 is a schematic block diagram of a LIDAR system disclosed herein.

Those of skill in the art will appreciate that any sort of data interfaces, data buses, control circuits, laser drivers, and laser receivers may be used. However, a full example implementation is now described with reference to FIG. 2A. This implementation may be considered as "simplified" because it illustrates a LIDAR ranging system 10' in which there are only three LIDAR ICs, but it should be kept in mind that this is shown for simplicity and that many real world implementations will include more than three LIDAR ICs.

The LIDAR ranging system 10' includes a plurality of LIDAR integrated circuits (IC) or chip packages 20, 30, 40 with 20 being the first LIDAR IC the chain and 40 being the last LIDAR IC in the chain. Therefore, LIDAR IC 20 can be considered a master to LIDAR IC 30, which can be considered a slave to LIDAR IC 20 and a master to LIDAR IC 40, which can be considered a slave to LIDAR IC 30.

Each LIDAR IC 20, 30, 40 includes a respective data interface 21, 31, 41, control circuitry or controller 22, 32, 42, laser driver 23, 33, 43, . . . , n3, and laser receiver (not shown for brevity). Respective one or more laser diodes LASD1, LASD2, LASD3 are activatable by their associated laser drivers 23, 33, 43 to provide ranging laser light.

LIDAR IC 20 is now described in detail. The data interface 21 is a low voltage differential sensing (LVDS) interface, and includes two such LVDS interfaces 25, 26. LVDS interface 25 includes a receiver 25a and transmitter 25b, while LVDS interface 26 includes a receiver 26a and a transmitter 26b. The control circuit 22 includes a multiplexer 22a having a first input coupled to the LVDS interface 25, a second input coupled to a master trigger signal MASTER_TRIGGER_SIGNAL, and which of the first and second inputs is passed as output is determined by the master select signal MASTER_SEL1. A time to digital converter (TDC) 22b has a first input coupled to the receiver 26a, a second input coupled to the transmitter 26b and to the output of the multiplexer 22a, and an output coupled to a processing circuit 22d. The delay block 22c receives the output of the multiplexer 22a as VCSEL_ON1, and a digital control signal DIG_CTRL1 from the processing circuit 22d. The laser driver 23 is a VCSEL (vertical cavity surface emitting laser) driver and drives a VCSEL diode VCSEL1. The processing circuit 22d provides output to a SPI bus SPI_BUS.

LIDAR IC 30 is now described in detail. The data interface 31 is a LVDS interface, and includes two such LVDS interfaces 35, 36. LVDS interface 35 includes a receiver 35a and transmitter 35b, while LVDS interface 36 includes a receiver 36a and a transmitter 36b. The control circuit 32 includes a multiplexer 32a having a first input coupled to the LVDS interface 35, and which of the first and second inputs is passed as output is determined by the master select signal MASTER_SEL2. A time to digital converter (TDC) 32b has a first input coupled to the receiver 36a, a second input coupled to the transmitter 36b and to the output of the multiplexer 32a, and an output coupled to a processing circuit 32d. The delay block 32c receives the output of the multiplexer 32a as VCSEL_ON2, and a digital control signal DIG_CTRL2 from the processing circuit 32d. The laser driver 33 is a VCSEL driver and drives a VCSEL diode VCSEL2. The processing circuit 32d provides output to the SPI bus SPI_BUS.

LIDAR IC 40 is now described in detail. The data interface 41 is a LVDS interface, and includes two such LVDS interfaces 45, 46. LVDS interface 45 includes a receiver 45a and transmitter 45b, while LVDS interface 46 includes a receiver 46a and a transmitter 46b. The control circuit 42 includes a multiplexer 42a having a first input coupled to the LVDS interface 45, and which of the first and second inputs is passed as output is determined by the master select signal MASTER_SEL3. A time to digital converter (TDC) 42b has a first input coupled to the receiver 46a, a second input coupled to the transmitter 46b and to the output of the multiplexer 42a, and an output coupled to a processing circuit 42d. The delay block 42c receives the output of the multiplexer 42a as VCSEL_ON3, and a digital control signal DIG_CTRL3 from the processing circuit 42d. The laser driver 43 is a VCSEL driver and drives a VCSEL diode VCSEL3.

Before beginning discussion of the operation in calibration mode, note that the master select signals are used to indicate whether a given LIDAR IC is the first LIDAR IC in the chain. Therefore, MASTER_SEL1 will be high, selecting MASTER_TRIGGER_SIGNAL to be passed by the multiplexer 22a. Accordingly, MASTER_SEL2 will be low, selecting the data received from the LVDS interface 35 to be passed by the multiplexer 32a, and MASTER_SEL3 will be low, selecting the data received from the LVDS interface 45 to be passed by the multiplexer 42a. The processing circuit 42d provides output to the SPI bus SPI_BUS.

Operation in the calibration mode will now be described. Beginning with the LIDAR IC 20, MASTER_TRIGGER_SIGNAL is asserted, and is passed by the multiplexer 22a as VCSEL_ON1 to the TDC 22b and the transmitter 26b. The TDC 22b immediately begins to count upon receipt of VCSEL_ON1 (which is asserted because MASTER_TRIGGER_SIGNAL is asserted). The transmitter 26b receives the VCSL_ON1 signal and transmits it as TRIGGER_SIGNAL1 to the receiver 35a of LIDAR IC 30. Upon receipt of TRIGGER_SIGNAL1 by the receiver 35a of the LIDAR IC 30, it will be retransmitted as CAL_SIGNAL1 by the transmitter 35b to the receiver 26a. Upon receipt of CAL_SIGNAL1 by the receiver 26a, it is passed to the TDC 22b, which stops counting, therefore recording the elapsed time between transmission of TRIGGER_SIGNAL1 and CAL_SIGNAL1 as ET1, and then halved and saved as delay time DELAY1 by the processing circuitry 22d. DELAY1 is passed from the processing circuitry 22d to the delay circuit 22c as DIG_CTRL1.

Turning now to LIDAR IC 30, upon receipt of TRIGGER_SIGNAL1 by the receiver 35a, it will be passed by the multiplexer 32a as VCSEL_ON2 to the transmitter 36b as well as to the TDC 32b, which will begin to count. The transmitter 36b will transmit VCSEL_ON2 as TRIGGER_SIGNAL2 to the receiver 45a of the LDAR IC 40. Upon receipt of TRIGGER_SIGNAL2 by the receiver 45a of the LIDAR IC 40, it will be retransmitted as CAL_SIGNAL2 by the transmitter 45b to the receiver 36a. Upon receipt of CAL_SIGNAL2 by the receiver 36a, it is passed to the TDC 32b, which stops counting, therefore recording the elapsed time between transmission of TRIGGER_SIGNAL2 and CAL_SIGNAL2 as ET2, and then halved and saved as delay time DELAY2 by the processing circuit 32d. DELAY2 is passed from the processing circuitry 32d to the delay circuit 32c as DIG_CTRL2, and is transmitted to the processing circuit 22d of the LIDAR IC 20 over the SPI bus SPI_BUS.

Turning now to the LIDAR IC 40, upon receipt of TRIGGER_SIGNAL2 by the receiver 45a, it will be passed by the multiplexer 42a as VCSEL_ON3 to the delay block 42c, the operation of which will be described below in ranging mode.

Ranging mode is now beginning with the LIDAR IC 20. MASTER_TRIGGER_SIGNAL will be asserted, which is then passed by the multiplexer 22a to the delay block 22c as VCSEL_ON1. The delay block 22c sends a control signal to the VCSEL driver 23 instructing it to turn on VCSEL1 after a time equal to DIG_CTRL1. VCSEL_ON1 is also passed to the transmitter 26b, which transmits it as TRIGGER_SIGNAL1 to the receiver 35a of the LIDAR IC 30.

Upon receipt of TRIGGER_SIGNAL1 by the receiver 35a, it is passed by the multiplexer 32a to the delay block 32c as VCSEL_ON2. The delay block 32c sends a control signal to the VCSEL driver 33 instructing it to turn on VCSEL2 after a time equal to DIG_CTRL2. VCSEL_ON2 is also passed to the transmitter 36b, which transmits it as TRIGGER_SIGNAL2 to the receiver 45a of the LIDAR IC 40.

Upon receipt of TRIGGER_SIGNAL2 by the receiver 45a, it is passed by the multiplexer 42a to the delay block 42c as VCSEL_ON3. The delay block 43c sends a control signal to the VCSEL driver 43 instructing it to turn on VCSEL3 substantially immediately.

As explained above, after an initial iteration of calibration mode, calibration may occur continuously and in parallel with ranging in a calibration while ranging mode.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A ranging system, comprising:
    a first ranging unit comprising:
        a first laser driver;
        a first control circuit configured to generate a first trigger signal; and
        a first data interface comprising a first trigger transmitter configured to transmit the first trigger signal over a first data transmission line and a first calibration receiver configured to receive a first calibration signal over a second data transmission line; and
    a second ranging unit comprising:
        a second laser driver;
        a second data interface comprising a second trigger receiver configured to receive the first trigger signal over the first data transmission line and a second calibration transmitter configured to transmit the first calibration signal over the second data transmission line; and
        a second control circuit configured to generate the first calibration signal in response to receipt of the first trigger signal by the second trigger receiver;
    wherein the first control circuit is configured to determine an elapsed time between transmission of the first trigger signal by the first trigger transmitter and receipt of the first calibration signal by the first calibration receiver;
    wherein the first control circuit generates a first control signal for the first laser driver to cause delayed activation of the first laser driver, the delay of the activation of the first laser driver being a function of the elapsed time determined by the first control circuit; and
    wherein the second control circuit generates a second control signal to cause activation of the second laser driver upon receipt of the first trigger signal by the second trigger receiver such that the first and second control signals cause simultaneous activation of the first and second laser drivers.

2. The ranging system of claim 1, wherein the delay is one half the elapsed time determined by the first control circuit.

3. The ranging system of claim 1, wherein the first and second data interfaces are low voltage differential sensing (LVDS) data interfaces.

4. The ranging system of claim 1, wherein the first control circuit comprises a first elapsed time measurement circuit configured to activate upon generation of the first trigger signal and to determine an elapsed time between transmission of the first trigger signal by the first trigger transmitter and receipt of the first calibration signal by the first calibration receiver.

5. The ranging system of claim 1, wherein the first control circuit comprises:
    a first elapsed time measurement circuit configured to activate upon generation of the first trigger signal and to determine an elapsed time between transmission of the first trigger signal by the first trigger transmitter and receipt of the first calibration signal by the first calibration receiver; and a delay circuit configured to generate a first control signal for the first laser driver to cause the first laser driver to activate a delay time after generation of the first trigger signal, the delay time being a function of the elapsed time determined by the first elapsed time measurement circuit.

6. The ranging system of claim 5, wherein the delay time is equal to one half of the determined elapsed time.

7. The ranging system of claim 5, wherein the first control circuit further comprises a multiplexer configured to selectively pass a master trigger signal as the first trigger signal in response to a master/slave selection signal.

8. The ranging system of claim 1, wherein the first and second ranging units are integrated circuit chips.

9. The ranging system of claim 1, wherein the first ranging unit further comprises a first laser unit driven by the first laser driver; wherein the second ranging unit further comprises a second laser unit driven by the second laser driver; wherein the first and second ranging units are physically arranged with respect to one another such that a first aperture through which the first laser unit emits laser beams is spaced apart from a second aperture through which the second laser unit emits laser beams by a first spacing distance.

10. The ranging system of claim 9, wherein the first spacing distance is no more than 1 cm.

11. The ranging system of claim 9, wherein the first laser unit has a first field of view; and wherein the second laser unit has a second field of view equal in span of angle to the first field of view.

12. The ranging system of claim 9, wherein the first laser unit comprises a first array of laser diodes driven by the first laser driver; and wherein the second laser unit comprises a second array of laser diodes driven by the second laser driver.

13. The ranging system of claim 1,
wherein the second data interface comprises a second calibration receiver configured to receive a second calibration signal over a fourth data transmission line, and a second trigger transmitter configured to transmit a second trigger signal over a third data transmission line;
wherein the second control circuit is further configured to generate the second trigger signal based upon receipt of the first trigger signal by the second trigger receiver over the first data transmission line, and to determine an elapsed time between transmission of the second trigger signal by the second trigger transmitter and receipt of the second calibration signal by the second calibration receiver; and
further comprising a third ranging unit, the third ranging unit comprising:
a third laser driver;
a third data interface comprising a third trigger receiver configured to receive the second trigger signal over the third data transmission line and a third calibration transmitter configured to transmit the second calibration signal over the fourth data transmission line; and
a third control circuit configured to generate the second calibration signal in response to receipt of the second trigger signal by the third trigger receiver.

14. The ranging system of claim 13,
wherein the first control circuit generates a first control signal for the first laser driver to cause delayed activation of the first laser driver, the delay of the activation of the first laser driver being a function of the elapsed time determined by the first control circuit and the elapsed time determined by the second control circuit;
wherein the second control circuit generates a second control signal for the second laser driver to cause delayed activation of the second laser driver, the delay of the activation of the second laser driver being a function of the elapsed time determined by the second control circuit;
wherein the third control circuit generates a third control signal for the third laser driver to cause activation of the third laser driver based upon receipt of the second trigger signal by the third trigger receiver.

15. The ranging system of claim 14, wherein the delay of activation of the first laser driver is equal to a sum of one half the elapsed time determined by the first control circuit and one half the elapsed time determined by the second control circuit; wherein the delay of activation of the second laser driver is equal to one half the elapsed time determined by the second control circuit; and wherein the third control circuit generates the third control signal to cause activation of the third laser driver substantially immediately upon receipt of the second trigger signal, such that the first, second, and third control signals cause simultaneous activation of the first, second, and third laser drivers.

16. The ranging system of claim 14, wherein the second control circuit sends the elapsed time determined by the second control circuit to the first control circuit over a data bus.

17. A method of synchronizing light output of a number N of ranging chips within a ranging system, the method comprising:
determining light output activation delays for first through the (N−1)th ranging chips by performing steps of:
a1) defining a number n to be equal to a first of the N ranging units;
a2) transmitting a trigger signal from an nth ranging unit to an (n+1)th ranging unit;
a3) receiving the trigger signal at the (n+1)th ranging unit;
a4) transmitting a calibration signal back from the (n+1)th ranging unit to the nth ranging unit;
a5) determining an elapsed time between transmission of the trigger signal by the nth ranging unit and receipt of the calibration signal by the nth ranging unit and storing the elapsed time as an elapsed time for the nth ranging unit;
a6) determining a light output activation delay for the nth ranging unit to be equal to a sum of the elapsed time for the nth ranging unit and the elapsed times for the first through the (n−1)th ranging unit; and
a7) if n is less than N−2, incrementing n, and returning to step a2); and
activating the N ranging chips to output light in a synchronized fashion, by performing steps of:
b1) defining a number m to be equal to a first of the N ranging units;
b2) transmitting a trigger signal from a mth ranging unit to a (m+1)th ranging unit;
b3) activating a laser of the mth ranging unit a time period after performing step b2), the time period equal to the light output activation delay for the mth ranging unit;
b4) if m is less than N−2, incrementing m, and returning to step b2); and b5) if m is equal to N−1, incrementing m, and activating a laser of the mth ranging unit upon receipt of the trigger signal by the mth ranging unit from the (m−1)th ranging unit.

\* \* \* \* \*